(No Model.)
J. T. SENN.
WELL FIXTURE.
No. 311,923. Patented Feb. 10, 1885.
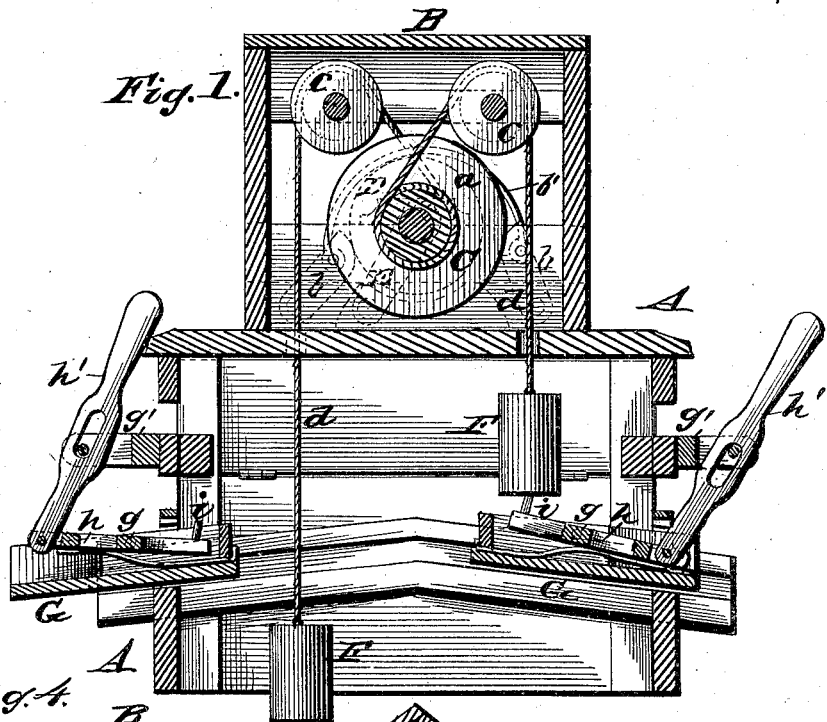
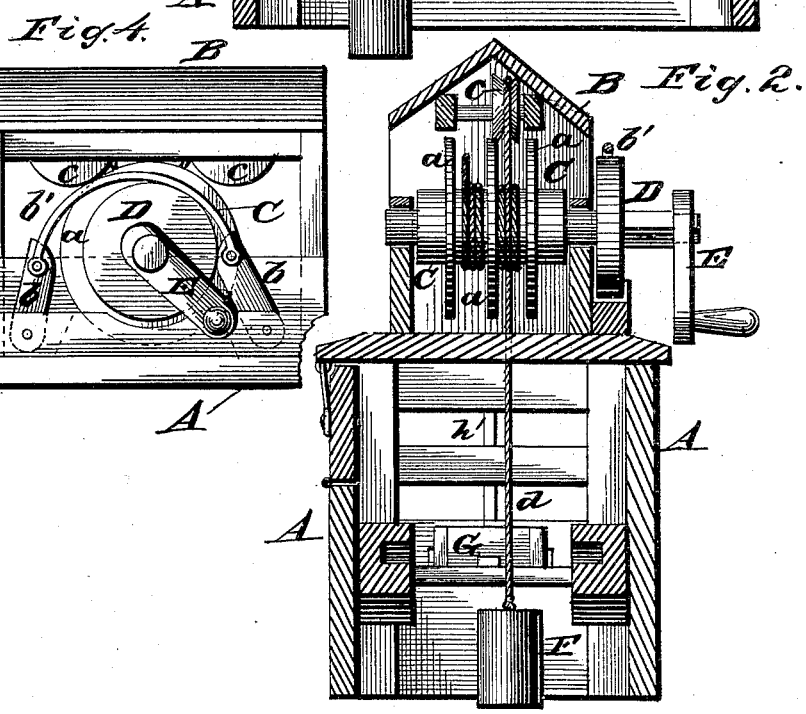
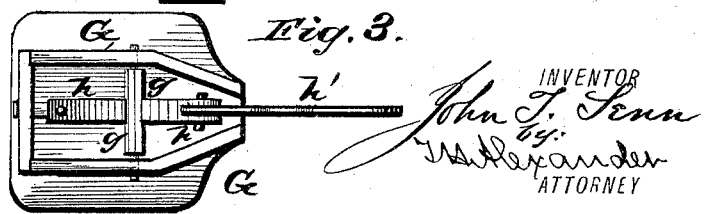
WITNESSES
Phil C. Dieterich
W. R. Keyworth
INVENTOR
John T. Senn
by T. S. Alexander
ATTORNEY

UNITED STATES PATENT OFFICE.

JOHN T. SENN, OF TROY, ALABAMA, ASSIGNOR TO HIMSELF AND ALEXANDER McKENZIE, OF SAME PLACE.

WELL-FIXTURE.

SPECIFICATION forming part of Letters Patent No. 311,923, dated February 10, 1885.

Application filed August 20, 1884. (No model.)

*To all whom it may concern:*

Be it known that I, JOHN T. SENN, of Troy, in the county of Pike and State of Alabama, have invented certain new and useful Improvements in Well-Fixtures; and I do hereby declare that the following is a full, clear, and exact description thereof, reference being had to the accompanying drawings, and to the letters of reference marked thereon, which form part of this specification.

The nature of my invention consists in certain novel accompaniments to well-curbs, as will be hereinafter more specifically described.

In the annexed drawings, Figure 1 is a central longitudinal section; Fig. 2, a central transverse section; and Fig. 3, a plan of one of the sliding troughs, with its tilting-lever. Fig. 4 is a detail view of wheel D and its dogs.

Similar letters of reference indicate corresponding parts.

A represents a well-curb inclosed at its top, sides, and ends. The one or both of its sides may have hinged doors for convenient access to the mouth of the well.

B represents a suitable inclosure or housing for the windlass C and pulleys $c\,c$. Upon the shaft of the windlass are secured three disks or collars, $a\,a\,a$, thus forming two divisions or reels for the hoisting ropes or chains.

D represents a plane-faced wheel, keyed or otherwise secured upon the windlass-shaft, just on the outer side of one of its bearings—*i. e.*, between the crank E and the shaft-journal.

$b\,b$ are two dogs or pawls, pivoted at their lower ends at such a distance in the rear and front of wheel D that they may rest in an inclined position against said wheel just below its center. The faces of these dogs are beveled, as shown in the drawings, so that when one or the other is set against the face of the wheel it will be free to rotate in one direction, but effectually prevented from going in the opposite direction.

$b'$ indicates a bail which is pivoted or otherwise suitably connected to the dogs near their upper ends. Thus it will be seen that when one of said dogs lies against the face or periphery of wheel D the other is elevated or thrown back. The pulleys $c\,c$ are hung above the reels in the position shown in Fig. 1. The chains or ropes $d\,d$ are wound around the reels in opposite directions, passed over pulleys $c\,c$, thence downward through suitable holes in the top of the well-curb, and to their lower ends are secured buckets F F. Each bucket is provided at its bottom with a suitable valve, so arranged that when pressed upward it will allow the water contained in said buckets to escape more or less in quantity, at the will of the operator. The tops of these buckets may be covered, but if so constructed they will be suitably perforated to admit water when in the well.

G G represent troughs which are arranged to slide endwise in the well-curb. These troughs are open at their forward but closed at their rear ends, and are provided with transverse rocking shafts $g\,g$, which have their bearings upon the sides of the troughs, and to which shafts are secured tilting-levers $h\,h$. The forward ends of these tilting-levers are bifurcated, and in said bifurcations are pivoted the lower ends of elongated slotted levers $h'\,h'$.

$g'\,g'$ are bifurcated projections in which the slotted levers $h'\,h'$ are pivoted. Beneath the tilting-levers $h\,h$ are flat or spiral springs arranged to keep the front ends of said levers normally in a raised position, and consequently the rear ends in a depressed position.

$i\,i$ represent pins secured near the inner ends of the tilting-levers, for the purpose of operating the valve in the bottom of the buckets.

It should be observed that the grooves in which the troughs slide are made slanting toward the outer ends, which will enable said troughs to be more easily slid forward. It will thus be seen that I provide means for obtaining water from wells which combines perfect safety and ease of manipulation with convenience, economy, and facility of operation.

From what has been said it will be seen that one of the buckets is, or is intended to be, always in the water. The dog on the side of the ascending buckets is adjusted against the face of the wheel and the windlass put in motion. When one of the buckets is sufficiently elevated, its sliding trough is, by means of lever $h$, slid under it, the dog in the meantime holding the windlass in position to enable the operator to do this. Then the trough is slid forward, when a downward pressure on the lever will cause the rear end of the tilting-lever to rise and the pin $i$ to press against the under side of the valve in the bottom of the bucket. Said bucket will thus discharge all of its water, or just so much of it as the operator requires for his purposes, while the remaining water in the bucket, if any, may be allowed to fall back in the well.

Having described my invention, I claim—

1. The combination, with a well-curb, of a sliding trough provided with a lever pivoted transversely upon the trough, and having on the end of its inner arm a pin adapted to raise the valve in the bottom of the bucket when the outer arm of the lever is depressed, thus allowing water to escape from the bucket into the trough, substantially as specified.

2. The combination, with a well-curb, of a sliding trough provided with a tilting-lever and an operating-lever, the latter being capable of both sliding the trough and depressing the tilting-lever, all substantially as and for the purposes set forth.

3. The combination, with a well-curb, of a sliding trough provided with a pivoted spring-controlled lever adapted to open the valve in the bucket, and means whereby the trough can be slid under the bucket and the lever actuated at the proper time, substantially as specified.

4. The combination, with a well-curb, A, sliding trough G, and spring-controlled lever $h$, secured to and turning with the rock-shaft $g$, and provided with the pin $i$, of the projection $g'$ and slotted lever $h'$, turning and sliding on a pin fixed to the said projection and passing through the slot in said lever, substantially as described.

5. The combination, with a well-curb and a windlass turning in bearings therein, of the wheel D and the dogs $b$, united by the bail $b'$, pivoted to their upper ends, and each arranged to strike the edge of the wheel D below its center and stop its rotation in one direction at the time that the bucket is in position to have its valve opened by the pin $i$ in the tilting-lever of the sliding trough, substantially as specified.

In testimony that I claim the foregoing as my own I affix my signature in presence of two witnesses.

JOHN T. SENN.

Witnesses:
  A. C. WORTHY,
  B. W. STARKE.